United States Patent [19]

Bacskai

[11] 4,011,282
[45] Mar. 8, 1977

[54] MALEIC ANHYDRIDE/2,5-DIHYDROFURAN COPOLYMERS

[75] Inventor: Robert Bacskai, Kensington, Calif.

[73] Assignee: Chevron Research Company, San Francisco, Calif.

[22] Filed: Sept. 10, 1975

[21] Appl. No.: 612,058

[52] U.S. Cl. .......................... 260/836; 260/837 R; 260/844; 526/271
[51] Int. Cl.$^2$ ................ C08F 220/08; C08F 63/00; C08F 63/02
[58] Field of Search ............. 260/78.5 R, 88.5, 836; 526/271

[56] References Cited
UNITED STATES PATENTS 3,732,332  5/1973  Curtis et al. ...................... 260/836

OTHER PUBLICATIONS

Eishun et al., Chem. Abs. 71 (1969) p. 61802a.
Eishun et al., Chem. Abs. 74 (1971) p. 32006a.

*Primary Examiner*—Harry Wong, Jr.
*Attorney, Agent, or Firm*—G. F. Magdeburger; John Stoner, Jr.; W. Keith Turner

[57] ABSTRACT

2,5-dihydrofurans and maleic anhydride are polymerized to prepare copolymers, having a dihydrofuran to anhydride mol ratio of from 1:2 to 1:3, useful as epoxy resin curing agents.

4 Claims, No Drawings

MALEIC ANHYDRIDE/2,5-DIHYDROFURAN COPOLYMERS

BACKGROUND OF THE INVENTION

This invention relates to the copolymers of 2,5-dihydrofurans and maleic anhydride, and heat curable epoxy resins comprising the copolymers.

Maleic anhydride polymers are commerically used in a wide variety of applications such as coatings. adhesives, thickeners, detergent builders, epoxy resins and the like. For many of these applications, such as for epoxy resins, it is desirable to use polymers having particular solubilities and melting points. Such properties are affected by the mol ratio of components in the repeating monomer of the polymer. For example, it is generally known that maleic anhydride copolymerizes to form alternating copolymers, i.e., each monomer unit of the polymer contains an average of one mol of maleic anhydride per mol of alternative component. Accordingly, while no absolute rules can be used to predict the physical properties of maleic anhydride alternating copolymers, it has been found the alternating copolymers are not suited for certain applications due to their melting point or solubility characteristics. For example, maleic anhydride has been copolymerized with 2,3-dihydrofuran to form a water-insoluble alternating copolymer having a reported melting point of approximately 200° C; see for example Bunzo et al, Kogyo Kagaru Zasshi, 1970, 73(3), 580-6. Other cyclic ethers, such as epichlorohydrin, have been copolymerized with 2,5-dihydrofuran to prepare linear alternating copolymers by a ring-opening mechanism; see for example Yuji et al, Makromol Chem., 1968, 119 (Dec.) 104-12. While these copolymers are satisfactory for many applications, it has been found that they are ineffective as epoxy resin curing agents in heat curable compositions.

It remains desirable to provide a maleic anhydride/dihydrofuran copolymer having a melting point substantially below 200° C which retains the ring structures of its components and is useful as an epoxy resin curing agent.

SUMMARY OF THE INVENTION

It has been found that compounds selected from the group consisting of 2,5-dihydrofuran and the polymerizable derivatives thereof will undergo copolymerization with maleic anhydride to form copolymers having an average dihydrofuran to anhydride mol ratio of from 1:2 to 1:3. The copolymers, which are water-soluble and have a melting point of from about 40° C to about 60° C, are effective epoxy resin curing agents.

DETAILED DESCRIPTION OF THE INVENTION

In accordance with this invention water-soluble copolymers of 2,5-dihydrofurans and maleic anhydride, having an average dihydrofuran to anhydride mol ratio of from 1:2 to 1:3, are provided.

Polymerizable 2,5-dihydrofurans which are suitable for use in the practice of this invention include 2,5-dihydrofuran and derivatives thereof which are capable of copolymerizing with maleic anhydride. Preferred 2,5-dihydrofurans suitable for use in the practice of this invention have the atomic structure:

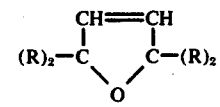

wherein each R is independently selected from hydrogen and lower alkyl containing from 1 to about 5 carbon atoms. Representative 2,5-dihydrofurans suitable for use in the practice of the invention include, for example:
2,5-dihydrofuran;
2,5-dihydro-2-methylfuran;
2,5-dihydro-2,2-dimethylfuran;
2,5-dihydro-2,2-dipentyl-5-methylfuran;
2,5-dihydro-2,2,5,5-tetraethylfuran;
2,5-dihydro-5-propylfuran;
2,5-dihydro-2,2-dibutyl-5,5-methylethylfuran;
2,5-dihydro-2,2-methylpropyl-5,5-ethylpentylfuran;
2,5-dihydro-5-isobutylfuran; and the like. 2,5-dihydrofuran is especially preferred for use in the practice of this invention.

The 2,5-dihydrofurans are commercially available materials. In general, they may be prepared by heating erythritol with a lower carboxylic acid.

Maleic anhydride, the second component of the copolymers of this invention, has the atomic structure:

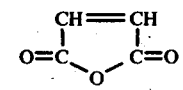

and is also commerically available. In general, maleic anhydride may be prepared by heating maleic acid in the presence of a catalyst such as acetyl chloride to a temperature of about 200° C.

2,5-dihydrofuran and the polymerizable derivatives thereof will spontaneously copolymerize with maleic anhydride when solubilized at a temperature of from about 25° C to about 200° C, preferably from about 50° C to about 100° C, to form water-soluble copolymers having an average dihydrofuran to anhydride mol ratio of from about 1:2 to about 1:3. The choice of solvent is not critical and any solvent capable of forming a solution of the 2,5-dihydrofuran compound and maleic anhydride is satisfactory. A typical copolymerization employs benzene or tetrahydrofuran as the solvent. The copolymer formed is insoluble in benzene and thus is readily separated by conventional procedures, such as filtration. The polymer may also be isolated by evaporation of the solvent.

While copolymerization is spontaneous and can therefore be carried out without the aid of catalysts, it has been observed that the use of free radical polymerization catalysts such as benzoylperoxide, lauroylperoxide, di-, tert-butylperoxide, tert-butyl-hydroperoxide, diisopropyl peroxydicarbonate, 2,2-aro-bis(isobutylnitrile), and the like, substantially increases the yield of copolymer.

It has been found that the copolymers of 2,5-dihydrofurans and maleic anhydride are effective curing agents in heat curable epoxy resin compositions. Thus, the present invention encompasses heat curable epoxy resin compositions, comprising: a curing agent comprising from about 1% to about 100%, preferably from about 80% to about 100%, by weight, of the copolymer of a dihydrofuran compound selected from the group consisting of 2,5-dihydrofuran and the polymerizable derivatives thereof, and maleic anhydride; and an epoxy resin.

The curing agent may contain, in addition to the hydrofuran copolymer, other curing agents such as amines, dibasic acids, and acid anhydrides, all of which are well known in the art. In addition, the curing agent may contain compatible adjuvants such as catalysts, diluents, fillers and coloring agents.

The epoxy resin is not critical to the invention, and any epoxy resin which will combine with a curing agent comprising the dihydrofuran/anhydride copolymer to form a hardened mass is suitable for use herein. Typical epoxy resins vary from thin liquids of low molecular weight, through viscous adhesives, to solids. In general, epoxy resins are linear polymers formed by the condensation of a polyhydroxy compound and an epoxide which are converted to hardened cross-linked polymers by reaction with a nucleophilic curing agent.

Typical epoxy resins suitable in the practice of the present invention are well known and are commerically available, a common class being the diglycidyl ethers of bisphenol A, obtained by reacting epichlorohydrin with bisphenol A in the presence of caustic such as sodium hydroxide or potassium hydroxide. In general, these materials may be represented by the formula:

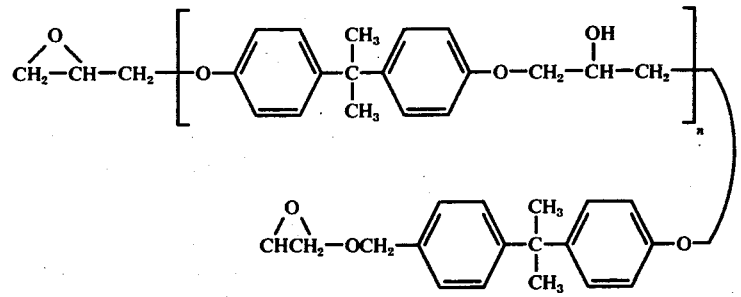

wherein n is zero or an integer of 1 or higher number.

Generally, the epoxy resins are obtained as a mixture of monomeric diepoxides (n=0) and of polymeric diepoxides (n ≥ 1). As is known in the art, by correlation of proportions of epichlorohydrin and bisphenol A, and caustic, the degree of polymerization can be controlled accordingly. Thus, increasing the epichlorohydrin to bisphenol A mol ratio, generally results in a mixture of diepoxide having a lower average molecular weight. On the other hand, increasing the mol ratio of sodium hydroxide to epichlorohydrin generally results in a mixture of higher average molecular weight.

Also, as is known in the art, other halohydrins than epichlorohydrin, such as 1,2-dichloro-3-hydroxypropane, and dichlorohydrin, can be used.

Similarly, in place of bisphenol A there can be used mononuclear di- and trihydroxy phenols, such as resorcinol, hydroquinone, pyrocatechol and phloroglucinol; polynuclear polyhydroxy phenols, such as 4,4'-dihydroxy diphenyl methane, trihydroxyl diphenyl dimethyl methane, and 4,4'-dihydroxy biphenyl.

Particularly useful hydroxyl intermediates in carrying out the present invention are the polynuclear polyhydroxy phenols also known as the novolac resins. Novolac resins containing 2 to 6, and as many as 12, phenolic hydroxyl groups per average molecule have been proposed in the preparation of the type of resin herein contemplated.

The novolac resins are well known substances, and many are available commerically. In general, these resins are prepared by condensing phenol with an aldehyde in the presence of an acid catalyst. Proportions of phenol and aldehyde in mol ratios of phenol to aldehyde greater than 1.1 and up to 2.5 are taught. As the aldehyde, formaldehyde is preferred, although the use of other aldehydes, such as acetaldehyde, chloral, butyraldehyde and furfural is permissible.

In the case of heat-curable epoxy compositions, the resin and curing agent are combined and, when curing is desired, are heated to cause conversion to the hardened polymer. The concentration of curing agent employed will vary depending on the resin, curing time, application, etc., as delineated in the art. For general guidance, concentrations of curing agent from about 5% to about 50%, preferably 10% to 20%, by weight of the total composition, are satisfactory for most purposes.

Additional adjuvants may be added to the epoxy compositions without altering the nature of the compositions. For example, various fillers, coloring agents, carriers, and the like may be used to adapt the compositions to particular applications.

The following examples further illustrate the copolymerization of 2,5-dihydrofuran and maleic anhydride and epoxy resin curing agents comprising these compounds, however as those skilled in the art will appreciate it is not intended that the scope of the invention be limited by the examples.

EXAMPLES I–IV 1.40 g of 2,5-dihydrofuran obtained from a commercial source and 1.96 g of maleic anhydride were solubilized in a sealable glass tube using 3.00 g of benzene. The tube was sealed at a temperature of 78° C and copolymerization was allowed to proceed for about 3.5 hours.

Following the above procedure 1.40 g of 2,5-dihydrofuran and 1.96 g of maleic anhydride were copolymerized in the presence of 0.065 g of benzoylperoxide. Two replicates were obtained.

For comparison, following the above procedure, 2.62 g of 2,3-dihydrofuran and 3.25 g of maleic anhydride were copolymerized in the presence of 0.12 g of benzoylperoxide.

Results of the copolymerizations are tabulated below.

TABLE I

|  | EXAMPLES | | | |
|---|---|---|---|---|
|  | I | II | III | IV |
| 2,5-dihydrofuran, g | 1.40 | 1.40 | 1.40 | |

TABLE I-continued

| | EXAMPLES | | | |
|---|---|---|---|---|
| | I | II | III | IV |
| 2,3-dihydrofuran, g | | | | 2.62 |
| Maleic anhydride, g | 1.96 | 1.96 | 1.96 | 3.25 |
| Benzene, g | 3.00 | 3.00 | 3.00 | 5.00 |
| Benzoylperoxide, g | — | 0.065 | 0.065 | 0.12 |
| Yield of copolymer (Mol % based on anhydride) | 49 | 82 | 86 | 94 |
| Softening point, ° C | 48–50 | 40–42 | 63–65 | >220 |
| Mol % of anhydride in copolymer | 70 | 75 | 67 | 44 |

Example IV illustrates that relative to the 2,3-dihydrofuran/maleic anhydride copolymers the 2,5-dihydrofuran/maleic anhydride copolymers have surprisingly low softening points and high maleic anhydride content. These properties are desirable for epoxy resin curing agents.

In the above procedure an equivalent amount of 2,5-dihydro-2-methylfuran; 2,5-dihydro-5-methylfuran; 2,5-dihydro-2,2-dipentylfuran; 2,5-dihydro-1,4-dimethylfuran; 2,5-dihydro-2,2-dimethylfuran; and 2,5-dihydro-5,5-dimethylfuran, respectively, is substituted for 2,5-dihydrofuran and the corresponding furan/maleic anhydride copolymer is prepared.

EXAMPLES V–VIII 0.3 g of 2,5-dihydrofuran/maleic anhydride copolymer was mixed with 2.7 g of epoxy resin (EPON 828 from the Shell Chemical Co.) in a glass vial. On heating in an oven at 150° C the mixture first became liquid, then solidified in about 2.5 hours. On cooling to room temperature a hard, transparent, homogeneous resin was obtained.

Following the above procedure, solidification was achieved with a mixture of 0.9 g 2,5-dihydrofuran/maleic anhydride copolymer and 2.1 g of epoxy resin in about 1.5 hours at 150° C.

For comparison, following the above procedure, 2,3-dihydrofuran/maleic anhydride copolymer was employed in place of the 2,5-dihydrofuran/maleic anhydride. Solidification was achieved at 150° C after about 6.5 hours. Upon cooling to room temperature non-transparent, inhomogeneous, soft products were obtained, indicating that curing had not taken place.

Results of these experiments are summarized below.

TABLE II

| | EXAMPLES | | | |
|---|---|---|---|---|
| | V | VI | VII | VIII |
| 2,5-dihydrofuran/maleic anhydride copolymer, g | 0.3 | — | 0.9 | — |
| 2,3-dihydrofuran/maleic anhydride copolymer, g | — | 0.3 | — | 0.9 |
| Epoxy resin, g | 2.7 | 2.7 | 2.1 | 2.1 |
| Temperature, ° C | 150 | 150 | 150 | 150 |
| Curing time, Hrs. | 2.5 | Did Not Cure | 1.5 | Did Not Cure |

What is claimed is:

1. The water soluble addition copolymer of a dihydrofuran compound having the formula

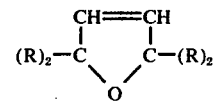

wherein each R is independently hydrogen or lower alkyl, and maleic anhydride wherein the average mol ratio of said dihydrofuran to anhydride is from about 1:2 to about 1:3, said copolymer having a melting point of from about 40° C to about 60° C.

2. The copolymer of claim 1 wherein said dihydrofuran compound is 2,5-dihydrofuran.

3. A heat-curable composition, which comprises from about 5% to about 50% by weight of a curing agent comprising the water-soluble addition copolymer of a dihydrofuran compound having the formula

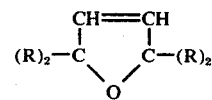

wherein each R is independently hydrogen of lower alkyl, and maleic anhydride wherein the average mol ratio of said dihydrofuran to anhydride is from about 1:2 to about 1:3, said copolymer having a melting point of from about 40° C to about 60° C and an epoxy resin.

4. A composition according to claim 3 wherein said dihydrofuran compound is 2,5-dihydrofuran.

* * * * *